United States Patent
Foskey

(10) Patent No.: US 12,202,600 B1
(45) Date of Patent: Jan. 21, 2025

(54) HIGH-SPEED TILTROTOR AIRCRAFT HAVING A VARIABLE-SWEEP WING

(71) Applicant: Textron Innovations Inc., Providence, RI (US)

(72) Inventor: Christopher Edward Foskey, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 18/377,465

(22) Filed: Oct. 6, 2023

(51) Int. Cl.
    *B64C 3/40* (2006.01)
    *B64C 29/00* (2006.01)

(52) U.S. Cl.
    CPC ............ *B64C 3/40* (2013.01); *B64C 29/0033* (2013.01)

(58) Field of Classification Search
    CPC ... B64C 3/40; B64C 39/0033; B64C 39/0075; B64U 30/12
    See application file for complete search history.

(56) References Cited

U.S. PATENT DOCUMENTS

| | | | | |
|---|---|---|---|---|
| 2,699,300 A | * | 1/1955 | Trotter | B64C 3/40 244/46 |
| 2,744,698 A | * | 5/1956 | Baynes | B64C 5/14 244/46 |
| 2,794,608 A | | 6/1957 | Johnson | |
| 3,188,025 A | | 6/1965 | Moorehead | |
| 7,789,343 B2 | | 9/2010 | Sarh et al. | |
| 10,414,483 B2 | | 9/2019 | Ivans et al. | |
| 10,696,376 B2 | * | 6/2020 | Ji | B64U 30/12 |
| 10,787,251 B2 | | 9/2020 | Foskey | |
| 11,325,719 B2 | | 5/2022 | Foskey et al. | |
| 11,603,191 B1 | | 3/2023 | Foskey et al. | |
| 12,103,696 B2 | * | 10/2024 | Passe | B64D 27/02 |
| 2006/0118675 A1 | * | 6/2006 | Tidwell | B64C 3/40 244/123.1 |
| 2017/0283035 A1 | * | 10/2017 | Ji | B64U 10/25 |
| 2023/0331393 A1 | * | 10/2023 | Passe | B64D 27/16 |

FOREIGN PATENT DOCUMENTS

CN      108482645 B * 4/2021 ............... B64C 3/40

* cited by examiner

*Primary Examiner* — Philip J Bonzell
(74) *Attorney, Agent, or Firm* — Lawrence Youst PLLC

(57) ABSTRACT

A variable-sweep wing for a tiltrotor aircraft includes a fuselage link coupled to the fuselage and a pylon link coupled to a pylon. A wing airframe has a root end pivotably coupled to the fuselage link and a tip end pivotably coupled to the pylon link. A driveshaft is coupled between the fuselage link and the pylon link and is positioned within the wing airframe. The driveshaft is operable to transmit torque from the main gearbox to a proprotor gearbox. A crank is coupled between the fuselage link and the pylon link and is positioned within the wing airframe. The fuselage link, the pylon link, the driveshaft and the crank form a linkage such that pivoting the crank relative to the fuselage link causes the wing airframe to shift between a substantially straight wing configuration for low-speed forward flight and a swept wing configuration for high-speed forward flight.

20 Claims, 13 Drawing Sheets

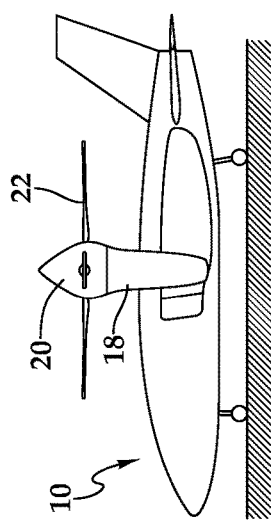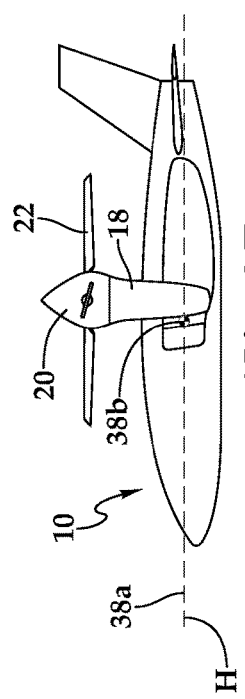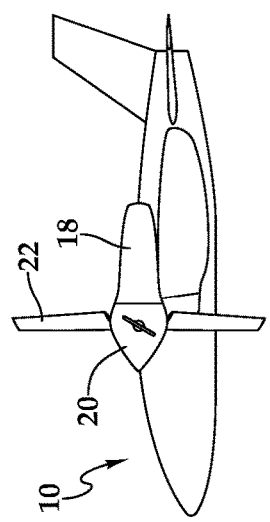
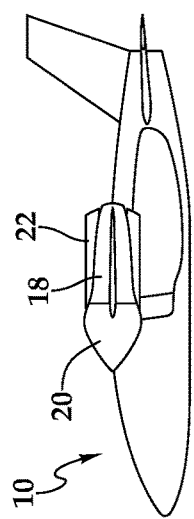
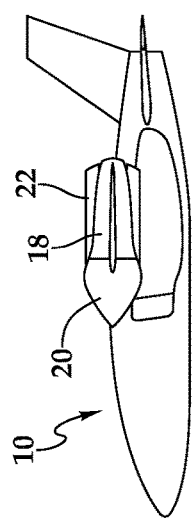

HIGH-SPEED TILTROTOR AIRCRAFT HAVING A VARIABLE-SWEEP WING

TECHNICAL FIELD OF THE DISCLOSURE

The present disclosure relates, in general, to tiltrotor aircraft having a vertical takeoff and landing flight mode and a plurality of forward flight modes and, in particular, to tiltrotor aircraft operable to transition between a low-speed forward flight mode and a high-speed forward flight mode by shifting a variable-sweep wing.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that, in forward flight, produce a downward turning of flow to generate the lift force that supports the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft can take off, hover and land vertically. One example of a VTOL aircraft is a helicopter which is a rotorcraft having one or more rotors that provide lift and thrust to the aircraft. The rotors not only enable hovering and vertical takeoff and landing, but also enable forward, backward and lateral flight. These attributes make helicopters highly versatile for use in congested, isolated or remote areas. Helicopters, however, typically lack the forward airspeed of fixed-wing aircraft due to the phenomena of retreating blade stall and limitations of advancing blade Mach number.

Tiltrotor aircraft, which are another type of VTOL aircraft, attempt to overcome this drawback by utilizing proprotors that can change their plane of rotation based on the operation being performed. Tiltrotor aircraft typically have two or more proprotors mounted near the outboard ends of a fixed wing. The proprotors are rotatable relative to the fixed wing such that the proprotors have a generally horizontal plane of rotation providing vertical thrust for takeoff, hovering and landing, much like a conventional helicopter, and a generally vertical plane of rotation providing forward thrust for cruising in forward flight with the fixed wing providing lift, much like a conventional propeller driven airplane. It has been found, however, that forward airspeed induced proprotor aeroelastic instability is a limiting factor relating to the maximum airspeed of tiltrotor aircraft in forward flight.

SUMMARY

In a first aspect, the present disclosure is directed to a variable-sweep wing for a tiltrotor aircraft having a main gearbox disposed within a fuselage and a proprotor gearbox disposed within a pylon. The variable-sweep wing includes a fuselage link coupled to the fuselage and a pylon link coupled to the pylon. A wing airframe has a root end that is pivotably coupled to the fuselage link and a tip end that is pivotably coupled to the pylon link. The wing airframe is shiftable between a substantially straight wing configuration and a swept wing configuration relative to the fuselage. A driveshaft is coupled between the fuselage link and the pylon link and is positioned within the wing airframe. The driveshaft is operable to transmit torque from the main gearbox to the proprotor gearbox. A crank is coupled between the fuselage link and the pylon link and is positioned within the wing airframe. The fuselage link, the pylon link, the driveshaft and the crank form a linkage such that pivoting the crank relative to the fuselage link causes the wing airframe to shift between the substantially straight wing configuration and the swept wing configuration.

In certain embodiments, the fuselage link may be fixed relative to the fuselage. In some embodiments, the wing airframe may include a wing box containing a forward spar and an aft spar with the driveshaft positioned between the forward and aft spars. In such embodiments, the wing airframe may also include a plurality of ribs and a wing skin with the driveshaft extending through each of the ribs and with the crank positioned aft of the driveshaft and within an interior of the wing skin. In certain embodiments, the driveshaft and the crank may be substantially parallel with each other. In some embodiments, the linkage formed by the fuselage link, the pylon link, the driveshaft and the crank may be a four-bar linkage such as a four-bar parallelogram linkage. In certain embodiments, the fuselage may have a longitudinal axis and the pylon may have a longitudinal axis such that the longitudinal axis of the fuselage and the longitudinal axis of the pylon remain substantially parallel with each other when the wing airframe is in the substantially straight wing configuration and in the swept wing configuration.

In some embodiments, an actuator disposed within the fuselage may be configured to pivot the crank relative to the fuselage link. In such embodiments, the actuator may be a linear actuator. In certain embodiments, a root gear set may be coupled to the fuselage link and a tip gear set may be coupled to the pylon link. In such embodiments, the driveshaft may be coupled between the root gear set and the tip gear set, the root gear set may be operable to transmit torque from the main gearbox to the driveshaft and/or the tip gear set may be operable to transmit torque from the driveshaft to the proprotor gearbox. In some embodiments, an output shaft may be coupled between the main gearbox and the root gear set and an input shaft may be coupled between the tip gear set and the proprotor gearbox. In such embodiments, the output shaft may be operable to transmit torque from the main gearbox to the root gear set and/or the input shaft may be operable to transmit torque from the tip gear set to the proprotor gearbox. In certain embodiments, the root gear set may be a bevel gear set and/or the tip gear set may be a bevel gear set.

In a second aspect, the present disclosure is directed to a tiltrotor aircraft having a low-speed forward flight mode and a high-speed forward flight mode. The tiltrotor aircraft includes a fuselage, a main gearbox disposed within the fuselage, a fuselage link coupled to the fuselage, a pylon, a proprotor gearbox disposed within the pylon and a pylon link coupled to the pylon. A wing airframe has a root end that is pivotably coupled to the fuselage link and a tip end that is pivotably coupled to the pylon link. The wing airframe is shiftable between a substantially straight wing configuration and a swept wing configuration relative to the fuselage. A driveshaft is coupled between the fuselage link and the pylon link and is positioned within the wing airframe. The driveshaft is operable to transmit torque from the main gearbox to the proprotor gearbox. A crank is coupled between the fuselage link and the pylon link and is positioned within the wing airframe. The fuselage link, the pylon link, the driveshaft and the crank form a linkage such that pivoting the crank relative to the fuselage link causes the wing airframe to shift between the substantially straight wing configuration for the low-speed forward flight mode and the swept wing configuration for the high-speed forward flight mode.

In some embodiments, the tiltrotor aircraft may include a lift engine disposed within the fuselage and operably coupled to the main gearbox and a thrust engine disposed within the fuselage. In certain embodiments, the tiltrotor aircraft may have a vertical takeoff and landing flight mode in which the wing airframe is in the substantially straight wing configuration. In some embodiments, the tiltrotor aircraft may have a rotary forward flight mode in which the wing airframe is in the substantially straight wing configuration. In certain embodiments, the tiltrotor aircraft may have a plurality of non-rotary forward flight modes including the low-speed forward flight mode and the high-speed forward flight mode. In some embodiments, in the high-speed forward flight mode, the tiltrotor aircraft may be configured for a forward airspeed that exceeds a maximum forward airspeed limited by proprotor aeroelastic instability in a rotary forward flight mode.

In a third second aspect, the present disclosure is directed to a tiltrotor aircraft having a vertical takeoff and landing flight mode, a rotary forward flight mode, a low-speed non-rotary forward flight mode and a high-speed non-rotary forward flight mode. The tiltrotor aircraft includes a fuselage with a wing pivotably coupled thereto. The wing has first and second outboard ends. The wing is shiftable between a substantially straight wing configuration and a swept wing configuration relative to the fuselage. First and second pylon assemblies are operably coupled to the wing proximate the first and second outboard ends, respectively. First and second proprotor assemblies are operably coupled to the first and second pylon assemblies, respectively. In the vertical takeoff and landing flight mode, the first and second proprotor assemblies rotate in a substantially horizontal plane and the wing is in the substantially straight wing configuration. In the rotary forward flight mode, the first and second proprotor assemblies rotate in a substantially vertical plane and the wing is in the substantially straight wing configuration. In the low-speed non-rotary forward flight mode, the first and second proprotor assemblies are non-rotating and the wing is in the substantially straight wing configuration. In the high-speed non-rotary forward flight mode, the first and second proprotor assemblies are non-rotating and the wing is in the swept wing configuration.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 2A-2J are schematic illustrations of a high-speed tiltrotor aircraft having a variable-sweep wing depicting a sequential flight-operating scenario in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1B:
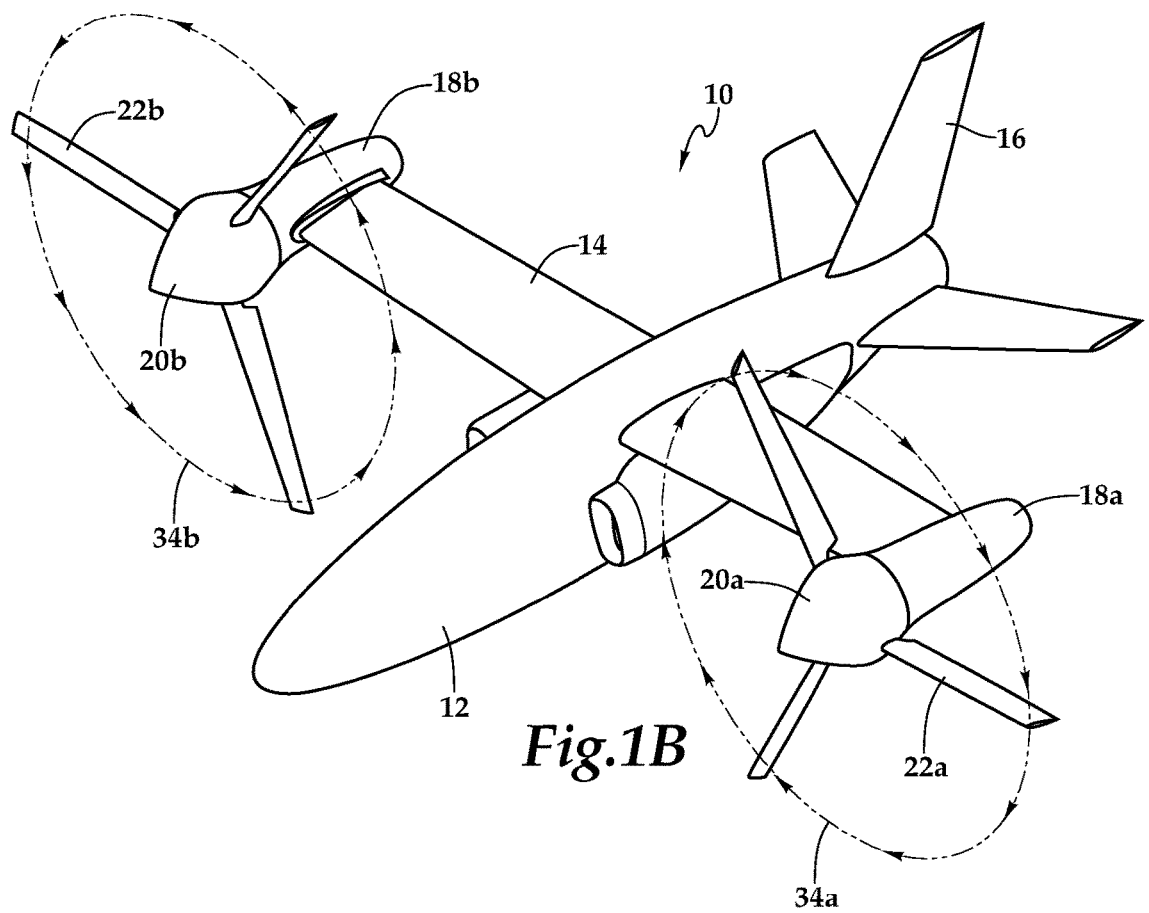
FIGS. 1A-1D are schematic illustrations of a high-speed tiltrotor aircraft having a variable-sweep wing in various configurations in accordance with embodiments of the present disclosure.
Figure 1A:
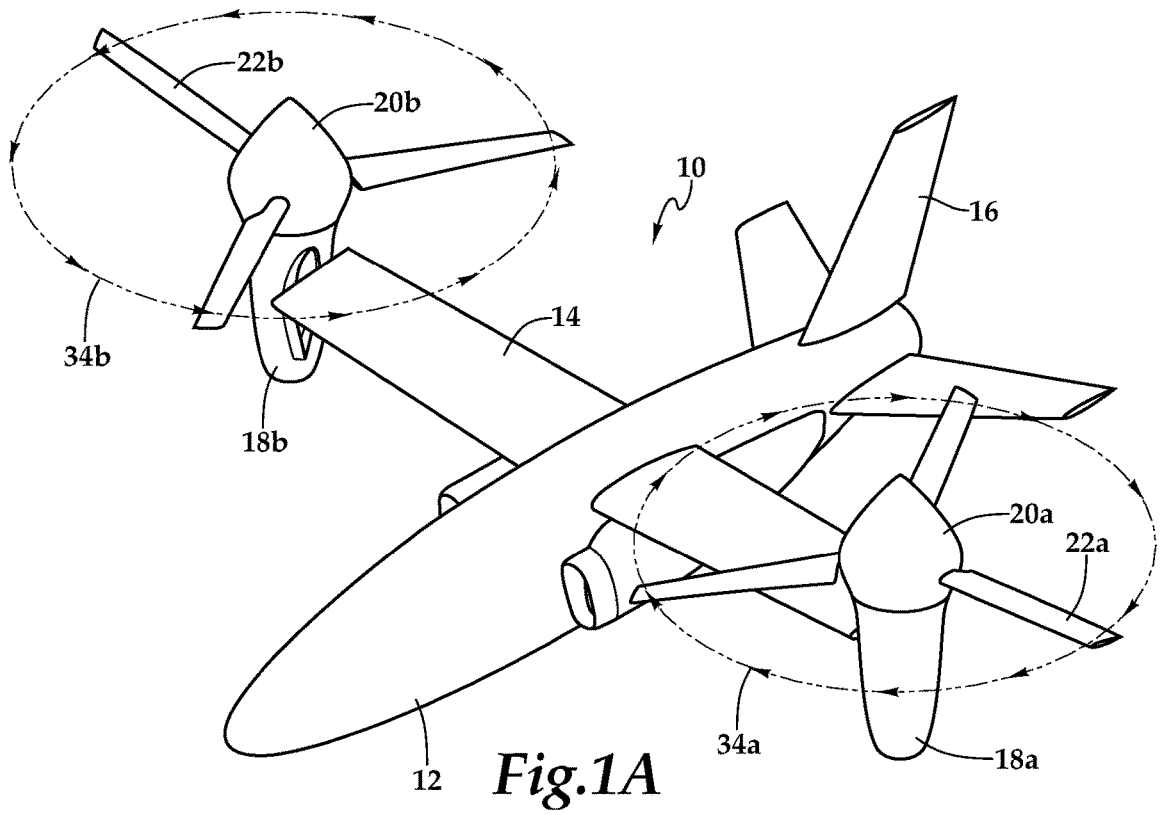
Figure 1D:
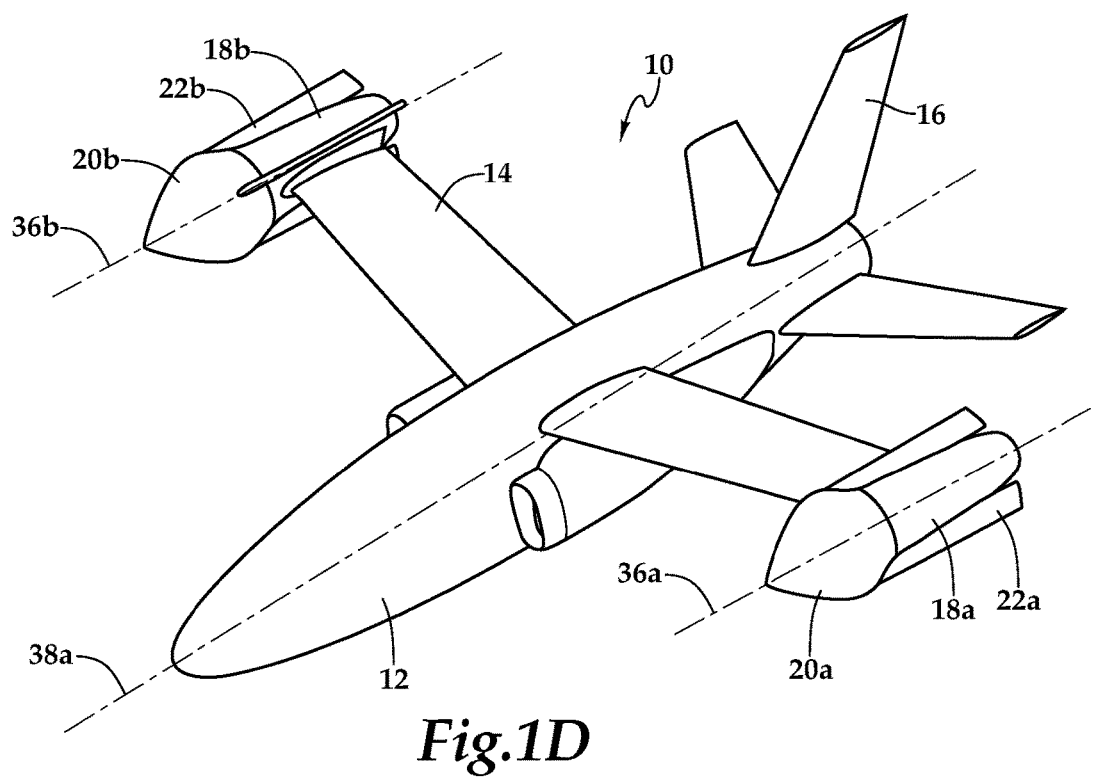
Figure 1C:
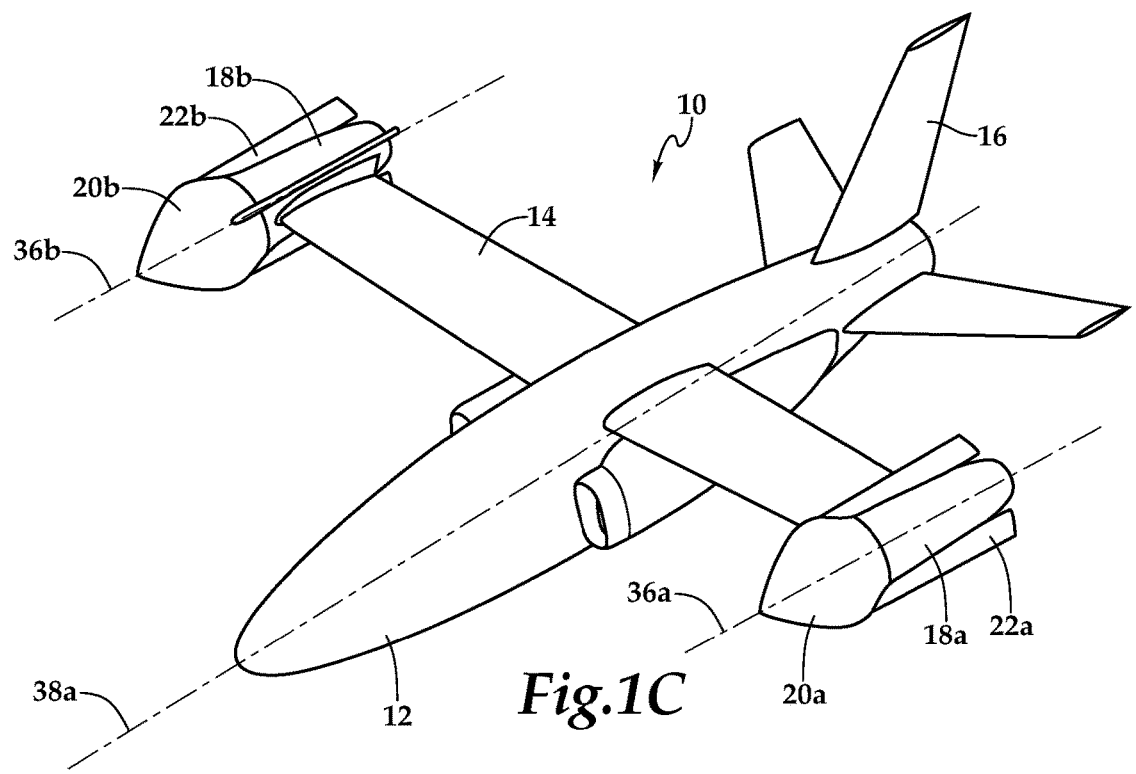

Referring to FIGS. 1A-1D in the drawings, a tiltrotor aircraft is schematically illustrated and generally designated 10. Aircraft 10 may be a manned aircraft operated, for example, by a pilot and a copilot or may be an unmanned aircraft such as an unpiloted aerial vehicle or a remotely piloted aircraft. Aircraft 10 includes a fuselage 12, a variable-sweep wing 14 and a tail assembly 16 including control surfaces operable for horizontal and/or vertical stabilization during forward flight. Located proximate the outboard ends of variable-sweep wing 14 are pylon assemblies 18a, 18b that are rotatable relative to variable-sweep wing 14 between a generally vertical orientation, as best seen in FIG. 1A, and a generally horizontal orientation, as best seen in FIGS. 1B-1D. Pylon assemblies 18a, 18b each house a portion of the drive system that is used to rotate proprotor assemblies 20a, 20b, respectively. Each proprotor assembly 20a, 20b includes a plurality of proprotor blades 22a, 22b that are operable to be rotated, as best seen in FIGS. 1A-1B, and operable to be folded, as best seen in FIGS. 1C-1D. In the illustrated embodiment, proprotor assembly 20a is rotated responsive to torque and rotational energy provided by a lift engine 24 via a main gearbox 26, a driveshaft 28a and a proprotor gearbox 30a (see also FIG. 3A). Likewise, proprotor assembly 20b is rotated responsive to torque and rotational energy provided by lift engine 24 via main gearbox 26, a driveshaft 28b and a proprotor gearbox 30b.

In the illustrated embodiment, lift engine 24 is a turboshaft engine located proximate a forward portion of fuselage 12. Main gearbox 26 may be a reduction gearbox that changes the direction of torque and is positioned within fuselage 12 proximate variable-sweep wing 14 such that main gearbox 26 may be referred to as a midwing gearbox. Aircraft 10 also has a thrust engine 32, such as a turbofan engine, located proximate an aft portion of fuselage 12. When aircraft 10 is operating in a vertical takeoff and landing flight mode (FIG. 1A) and in a rotary forward flight mode (FIG. 1B), lift engine 24 provides power to proprotor assemblies 20a, 20b. When aircraft 10 is operating in a low-speed non-rotary forward flight mode (FIG. 1C) and in a high-speed non-rotary forward flight mode (FIG. 1D), thrust engine 32 provides power to propel aircraft 10. In other embodiments, aircraft 10 could have a single engine that is operable to transition between a turboshaft mode to selectively provide torque and rotational energy to proprotor assemblies 20a, 20b during vertical takeoff and landing and rotary forward flight and a turbofan mode to selectively provide propulsive thrust during the non-rotary flight modes.

FIG. 1A illustrates aircraft 10 in the VTOL or helicopter flight mode, in which proprotor assemblies 20a, 20b are rotating in a substantially horizontal plane to provide thrust-borne lift for aircraft 10, such that aircraft 10 flies much like a conventional helicopter including being capable of vertical takeoff, hovering, relatively low-speed directional movement and vertical landing. In the illustrated embodiment, hot combustion gases in lift engine 24 cause rotation of a power turbine coupled to an output shaft that is used to power the drive system of aircraft 10 and to provide torque and rotational energy to proprotor assemblies 20a, 20b. FIG. 1B illustrates aircraft 10 in rotary forward flight mode, in which proprotor assemblies 20a, 20b are rotating in a substantially vertical plane to provide a forward thrust enabling variable-sweep wing 14 to provide wing-borne lift responsive to the forward airspeed, such that aircraft 10 flies much like a conventional propeller driven aircraft. In this configuration, the output shaft of lift engine 24 is used to power the drive system of aircraft 10 and to provide torque and rotational energy to proprotor assemblies 20a, 20b. Transitions between the VTOL flight mode and the rotary forward flight mode of aircraft 10 are achieved by changing the angular positions of pylon assemblies 18a, 18b between the generally horizontal position and the generally vertical position. Pylon assemblies 18a, 18b may be tiltable between the vertical and horizontal positions by actuators (not shown) that are engaged in response to commands originating from the pilot, the flight control computer and/or other flight control system.

In the rotary flight modes of aircraft 10, proprotor assemblies 20a, 20b rotate in opposite directions to provide torque balancing to aircraft 10. For example, when viewed from the front of aircraft 10 during rotary forward flight (FIG. 1B) or from above during VTOL flight (FIG. 1A), proprotor assembly 20a rotates clockwise, as indicated by motion arrows 34a, and proprotor assembly 20b rotates counterclockwise, as indicated by motion arrows 34b. In the illustrated embodiment, proprotor assemblies 20a, 20b each include three proprotor blades that are equally spaced apart circumferentially at approximately 120 degree intervals. It should be understood by those having ordinary skill in the art, however, that the proprotor assemblies of the present disclosure could have proprotor blades with other designs and other configurations including proprotor assemblies having two, four, five or more proprotor blades. In addition, it should be appreciated that aircraft 10 can be operated such that proprotor assemblies 20a, 20b are selectively positioned between the forward flight mode and the helicopter mode, which can be referred to as a conversion flight mode.

When it is desired to transition from rotary forward flight mode to non-rotary forward flight mode, thrust engine 32 is engaged to provide propulsive thrust for aircraft 10. In the illustrated embodiment, hot combustion gases in thrust engine 32 cause rotation of a power turbine coupled to an output shaft that is used to power a turbofan that forces bypass air through a fan duct to create forward thrust enabling variable-sweep wing 14 to provide wing-borne lift responsive to the forward airspeed of aircraft 10, such that aircraft 10 flies much like a conventional jet aircraft. In addition, lift engine 24 is disengaged from proprotor assemblies 20a, 20b and proprotor blades 22a, 22b are feathered, or oriented to be streamlined in the direction of flight, such that proprotor blades 22a, 22b function as brakes to aerodynamically slow the rotation of proprotor assemblies 20a, 20b. A braking system may also be used to stop the rotation of proprotor blades 22a, 22b and preferably clock proprotor blades 22a, 22b to a desired angular orientation relative to pylon assemblies 18a, 18b. As illustrated in FIG. 1C, proprotor blades 22a, 22b are then folded aftwardly such that proprotor blades 22a, 22b are oriented substantially parallel to pylon assemblies 18a, 18b to minimize the drag force generated by proprotor blades 22a, 22b during forward flight. In this configuration, aircraft 10 is in a low-speed forward flight mode, which may be limited to subsonic speeds due to the straight wing configuration of aircraft 10.

As illustrated in FIGS. 1A-1C, variable-sweep wing 14 is configured as a substantially straight wing which is typical of many tiltrotor aircraft as the straight wing design provides suitable clearance to avoid any contact between proprotor blades 22a, 22b and the wing in the rotary forward flight mode. Specifically, during rotary forward flight, proprotor blades 22a, 22b engage in a certain degree of flapping which tends to bring the tips of proprotor blades 22a, 22b toward to the leading edge of the wing. If the wing had a swept wing design, the distance between the leading edge of the wing proximate the tips of proprotor blades 22a, 22b would be reduced. One solution to the swept wing clearance issue could be to extend the forward length of pylon assemblies 18a, 18b such that the nominal rotational plane of proprotor assemblies 20a, 20b is shifted forward to accommodate the swept wing design. It has been found, however, that extending the forward length of pylon assemblies 18a, 18b tends to increase the likelihood of proprotor aeroelastic instability, which can be detrimental to the flight of a tiltrotor aircraft.

The embodiments illustrated herein, overcome the speed limitations of a straight wing design and aeroelastic instability potential of extending the pylon assemblies forward to accommodate a swept wing design by shifting the configuration of variable-sweep wing 14 between a substantially straight wing configuration and a swept wing configuration. Specifically, after transitioning power from lift engine 24 to thrust engine 32 and folding proprotor blades 22a, 22b, variable-sweep wing 14 is operated from the substantially straight wing configuration illustrated in FIG. 1C to the swept wing configuration illustrated in FIG. 1D, which transitions aircraft 10 from the low-speed forward flight mode to a high-speed forward flight mode. The swept wing configuration of variable-sweep wing 14 enables aircraft 10 to operate at transonic speeds by increasing the critical Mach speed of variable-sweep wing 14. Importantly, the longitudinal axes 36a, 36b of pylon assemblies 18a, 18b remain substantially parallel to the longitudinal axis 38a of fuselage 12 in both the low-speed forward flight mode and the high-speed forward flight mode to reduce the drag penalty of pylon assemblies 18a, 18b by minimizing the frontal profile areas of pylon assemblies 18a, 18b that are exposed to freestream airflow during forward flight. It is noted that in both the low-speed forward flight mode and the high-speed forward flight mode, the forward cruising speed of aircraft 10 significantly exceeds the maximum forward airspeed in the rotary forward flight mode, which is limited by forward airspeed induced proprotor aeroelastic instability.

Figure 2F:
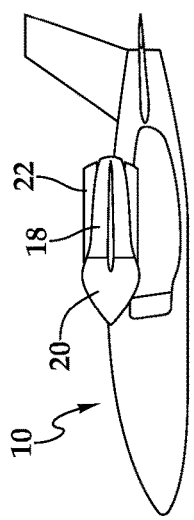
Figure 2G:
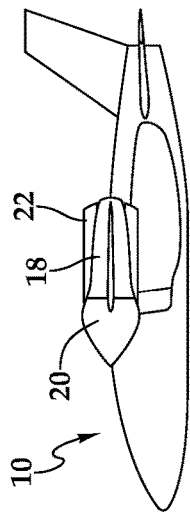
Figure 2H:
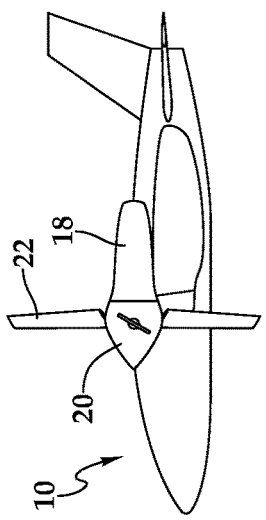
Figure 2I:
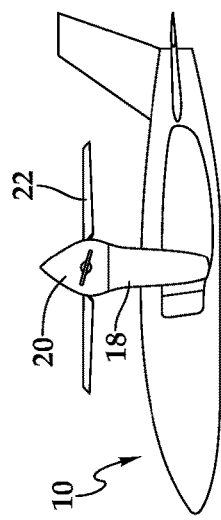

Referring additionally to FIGS. 2A-2J in the drawings, a sequential flight-operating scenario of aircraft 10 is depicted. As best seen in FIG. 2A, aircraft 10 is positioned on the ground prior to takeoff. When aircraft 10 is ready for a mission, an onboard flight control computer commences operations to provide flight control to aircraft 10 which may be commanded by an onboard pilot, a remote flight control system, an onboard autonomous flight control system or a combination thereof. For example, it may be desirable to utilize onboard pilot flight control during certain maneuvers such as vertical takeoff and landing but rely on autonomous flight control during other maneuvers such as hover, transitions between thrust-borne lift and wing-borne lift and/or transitions between substantially straight wing flight and swept wing flight.

As best seen in FIG. 2B, aircraft 10 has performed a vertical takeoff and is engaged in thrust-borne lift with proprotor assemblies 20 (collectively referring to proprotor assemblies 20a, 20b) rotating in substantially the same horizontal plane. In the illustrated embodiments, as longitudinal axis 38a and the lateral axis, depicted as target 38b, of aircraft 10 are both in the horizontal plane H, aircraft 10 has a level flight attitude. During VTOL operations, the flight control computer may utilize changes in collective and/or cyclic blade pitch to control the flight dynamics of aircraft 10 including maintaining altitude stability and providing pitch, roll and yaw authority. In addition to vertical operations, aircraft 10 may perform relatively low-speed directional movement in the VTOL flight mode.

After vertical ascent to the desired elevation, aircraft 10 may begin the conversion from thrust-borne lift to wing-borne lift. This is achieved by changing the angular positions of pylon assemblies 18 (collectively referring to pylon assemblies 18a, 18b) via a pitch down maneuver from the generally vertical orientation in FIG. 2B to the generally horizontal orientation in FIG. 2C. During the conversion process, the vertical lift portion of the thrust generated by proprotor assemblies 20 progressively decreases as the forward thrust portion of the thrust generated by proprotor assemblies 20 progressively increases. This urges aircraft 10 to accelerate in the forward direction such that the forward airspeed of aircraft 10 increases allowing variable-sweep wing 14 to offload a portion and eventually all the lift requirement from proprotor assemblies 20. As best seen in FIG. 2C, pylon assemblies 18 have been collectively inclined about ninety degrees pitch down such that proprotor assemblies 20 are rotating in substantially the same vertical plane providing forward thrust for aircraft 10 while variable-sweep wing 14 provides wing-borne lift. In the forward flight modes, pitch, roll and yaw authority may be provided by collective and/or differential operations of control surfaces such as ailerons, elevators, a rudder and the like.

When it is desired to transition from rotary forward flight to non-rotary forward flight, aircraft 10 transitions from lift engine power to thrust engine power. Once thrust engine 32 is engaged and providing propulsive thrust and lift engine 24 is disengaged and no longer providing torque and rotational energy to proprotor assemblies 20a, 20b, proprotor blades 22 (collectively referring to proprotor blades 22a, 22b) are feathered to slow and eventually stop the rotation of proprotor assemblies 20 such that proprotor blades 22 may be folded aftwardly, as best seen in FIG. 2D. When it is desired to transition from the low-speed forward flight mode to the high-speed forward flight mode, variable-sweep wing 14 is operated from the substantially straight wing configuration to the swept wing configuration, as best seen in FIG. 2E. It is noted that the longitudinal axes of pylon assemblies 18 remain substantially parallel to the longitudinal axis of aircraft 10 in the low-speed forward flight mode, the high-speed forward flight mode and transitions therebetween.

Figure 2J:
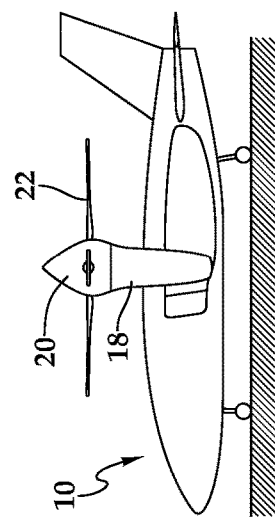

As aircraft 10 approaches its destination, aircraft 10 may begin its transition from wing-borne lift to thrust-borne lift. As best seen from the progression of FIGS. 2F-2G, variable-sweep wing 14 is operated from the swept wing configuration to the substantially straight wing configuration, returning aircraft 10 to the low-speed forward flight mode. As best seen from the progression of FIGS. 2G-2H, proprotor blades 22 are unfolded, lift engine 24 is engaged to provide torque and rotational energy to proprotor assemblies 20 and thrust engine 32 is disengaged, returning aircraft 10 to the rotary forward flight mode. As best seen from the progression of FIGS. 2H-2I, pylon assemblies 18 perform a pitch up maneuver from the generally horizontal orientation to the generally vertical orientation during which the vertical lift portion of the thrust generated by proprotor assemblies 20 progressively increases as the forward thrust portion of the thrust generated by proprotor assemblies 20 progressively decreases until the entire lift requirement is supported by proprotor assemblies 20. As best seen in FIG. 2J, aircraft 10 has landed at the destination location.

Figure 3A:
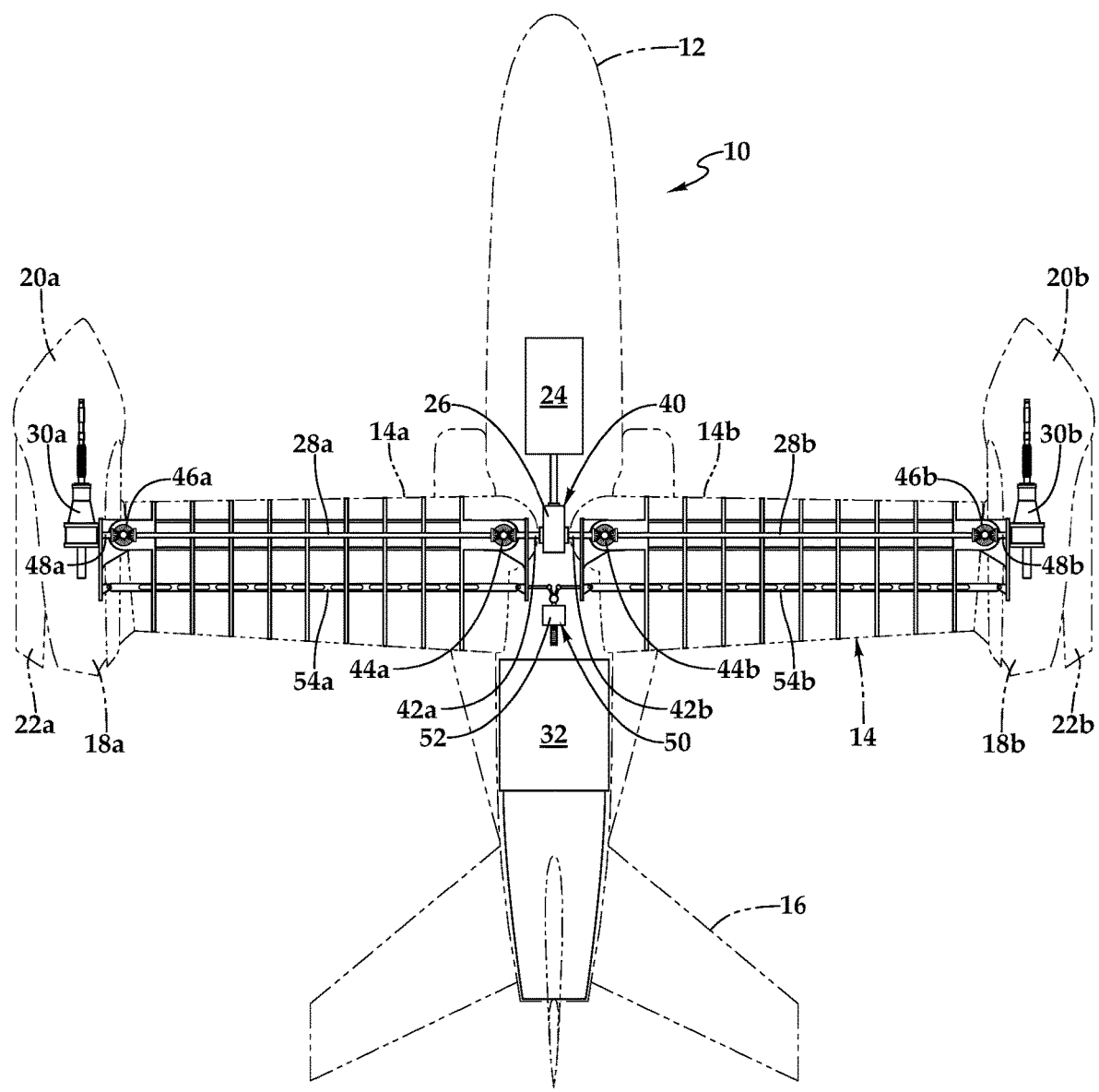
FIGS. 3A-3B are plan views of a high-speed tiltrotor aircraft having a variable-sweep wing in a low-speed substantially straight wing configuration and a high-speed swept wing configurations in accordance with embodiments of the present disclosure.
Figure 3B:
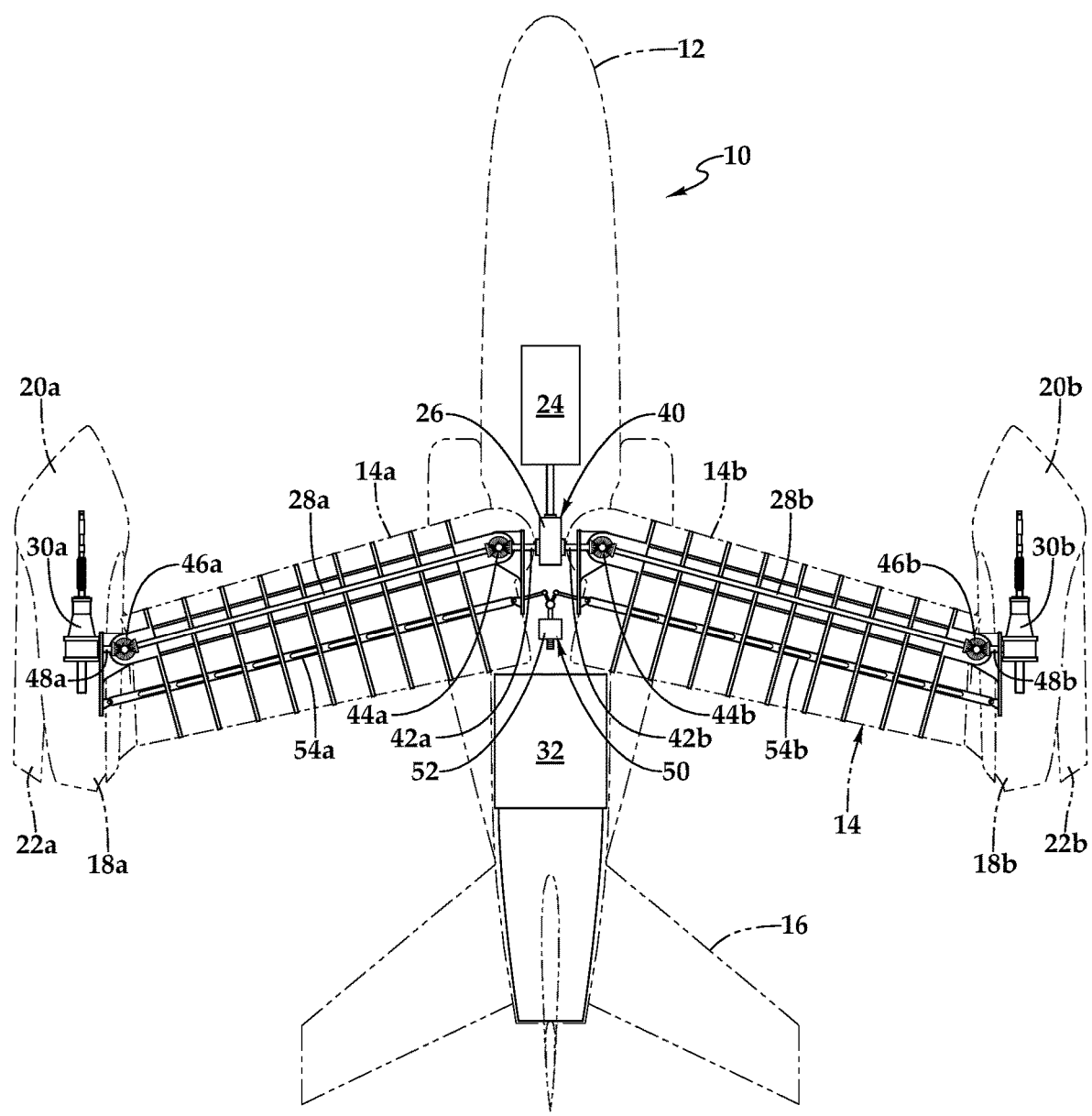

Referring additional to FIGS. 3A-3B in the drawings, various systems of aircraft 10 will now be discussed. Aircraft 10 has a drivetrain 40 that is configured to transfer torque and rotational energy from lift engine 24 to proprotor assemblies 20a, 20b. Drivetrain 40 includes main gearbox 26 that is disposed within fuselage 12 of aircraft 10 and proprotor gearboxes 30a, 30b that are respectively disposed within pylon assemblies 18a, 18b. Drivetrain 40 provides a torque path from main gearbox 26 to proprotor gearbox 30a that includes an output shaft 42a, a root bevel gear set 44a, driveshaft 28a, a tip bevel gear set 46a and an input shaft 48a, each of which may be at least partially disposed within variable-sweep wing 14. Similarly, drivetrain 40 provides a torque path from main gearbox 26 to proprotor gearbox 30b that includes an output shaft 42b, a root bevel gear set 44b, driveshaft 28b, a tip bevel gear set 46b and an input shaft 48b, each of which may be at least partially disposed within variable-sweep wing 14. In the rotary flight modes of aircraft 10, lift engine 24 provides torque and rotational energy to proprotor assemblies 20a, 20b via drivetrain 40 including main gearbox 26, output shafts 42a, 42b, root bevel gear sets 44a, 44b, driveshafts 28a, 28b, tip bevel gear sets 46a, 46b, input shafts 48a, 48b and proprotor gearboxes 30a, 30b. In the rotary flight modes of aircraft 10, variable-sweep wing 14 is in the straight wing configuration.

In the non-rotary flight modes of aircraft 10, lift engine 24 does not provide torque and rotational energy to proprotor assemblies 20a, 20b via drivetrain 40. Nonetheless, in both the low-speed non-rotary forward flight mode with variable-sweep wing 14 in the straight wing configuration, as best seen in FIG. 3A, and the high-speed non-rotary forward flight mode with variable-sweep wing 14 in the swept wing configuration, as best seen in FIG. 3B, the rotating components of drivetrain 40 retain continuity. More specifically, main gearbox 26, output shaft 42a, root bevel gear set 44a, driveshaft 28a, tip bevel gear set 46a, input shaft 48a and proprotor gearbox 30a remain coupled together in the straight wing configuration and in the swept wing configuration of variable-sweep wing 14 as well as during transitions therebetween. Likewise, main gearbox 26, output shaft 42b, root bevel gear set 44b, driveshaft 28b, tip bevel gear set 46b, input shaft 48b and proprotor gearbox 30b remain coupled together in the straight wing configuration and in the swept wing configuration of variable-sweep wing 14 as well as during transitions therebetween. Maintaining drivetrain continuity in all aircraft configurations not only enhances the overall reliability of aircraft 10 but also tends to extend the life of the rotating components.

Aircraft 10 has a wing actuation system 50 that includes an actuator 52, depicted as a linear actuator, which is disposed within fuselage 12 and a pair of cranks 54a, 54b, each of which is at least partially disposed within variable-sweep wing 14. As best seen by the progression of FIG. 3A to FIG. 3B, operation of actuator 52 from the retracted position to the extended position causes variable-sweep wing 14 to shift from the straight wing configuration to the swept wing configuration. Likewise, as best seen by the progression of FIG. 3B to FIG. 3A, operation of actuator 52 from the extended position to the retracted position causes variable-sweep wing 14 to shift from the swept wing configuration to the straight wing configuration. In the illustrated embodiments, variable-sweep wing 14 includes a wing airframe 14a and a wing airframe 14b that are independent of one another with wing airframe 14a pivotably coupled between fuselage 12 and pylon assembly 18a and wing airframe 14b pivotably coupled between fuselage 12 and pylon assembly 18b.

Figure 4A:
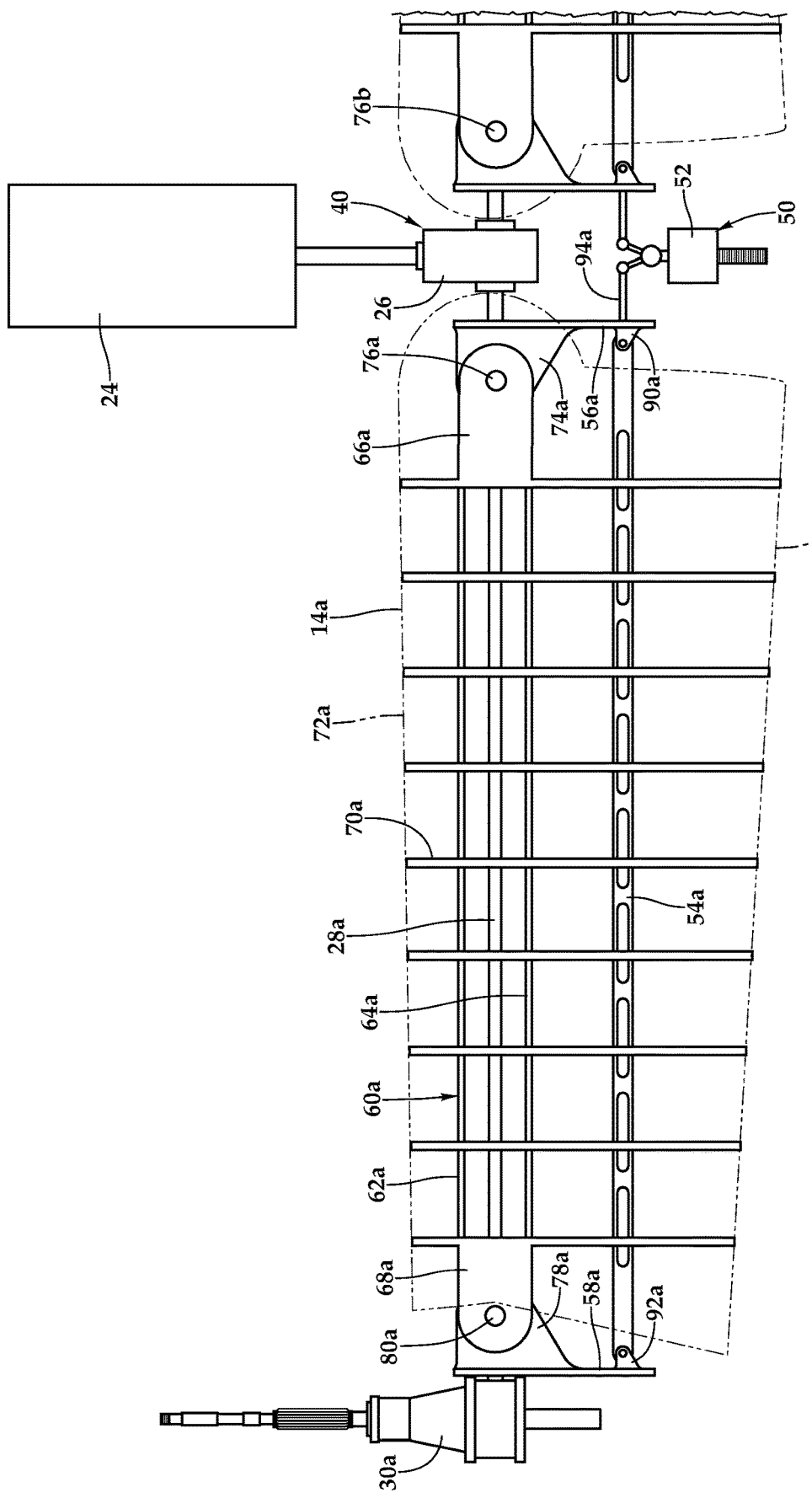
FIGS. 4A-4B are plan views of a variable-sweep wing of a high-speed tiltrotor aircraft in accordance with embodiments of the present disclosure.
Figure 4B:
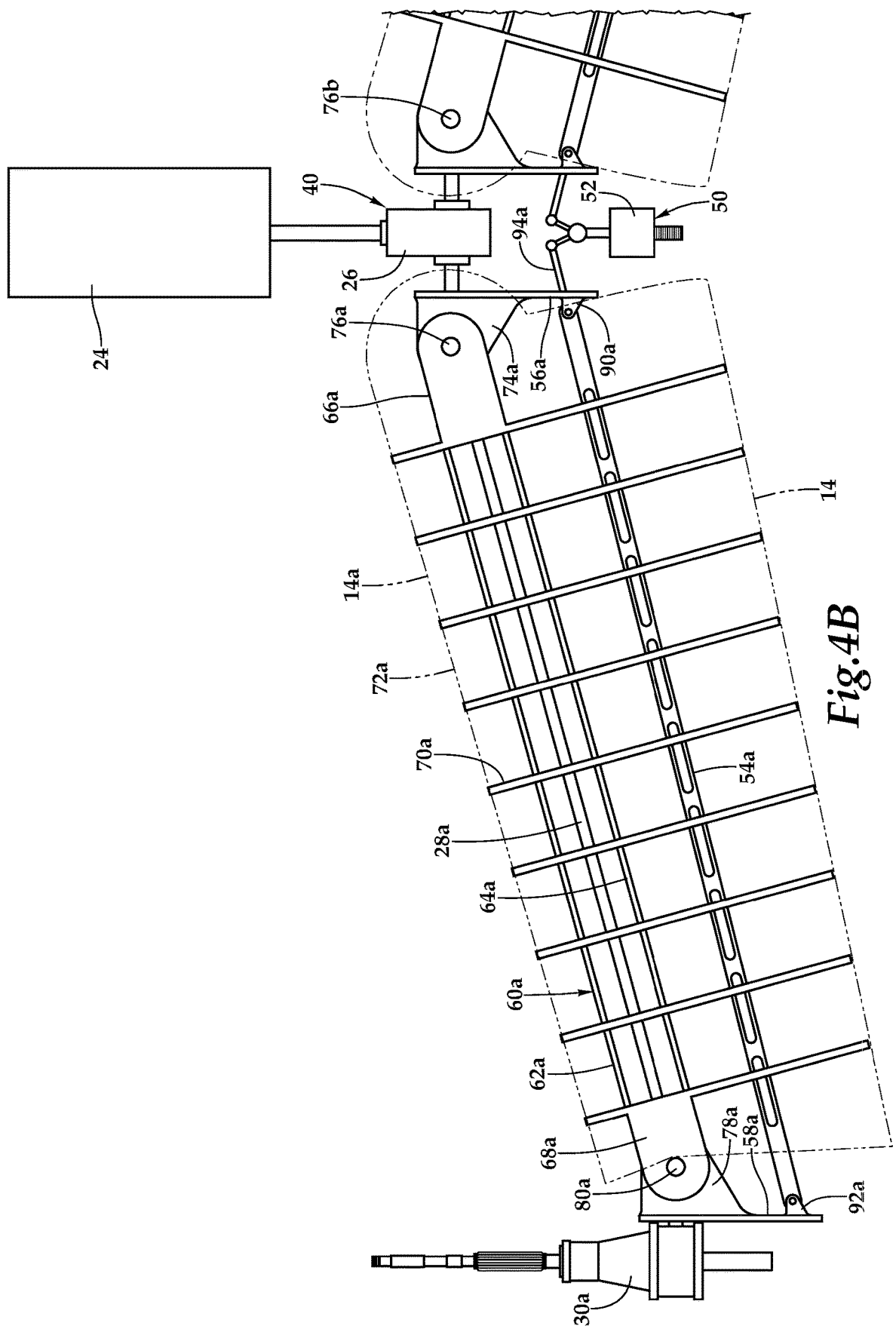

Referring additionally to FIGS. 4A-4B of the drawings, details relating to variable-sweep wing 14 will now be discussed. It should be noted that the right side of variable-sweep wing 14 is substantially similar to the left side of variable-sweep wing 14 therefore, for sake of efficiency, certain features will be disclosed only with regard to the left side of variable-sweep wing 14. One having ordinary skill in the art, however, will fully appreciate an understanding of the right side of variable-sweep wing 14 based upon the disclosure herein of the left side of variable-sweep wing 14. Wing airframe 14a is pivotably coupled to fuselage 12 at a fuselage link 56a that is fixed relative to fuselage 12 and pivotably coupled to pylon assembly 18a at a pylon link 58a. Wing airframe 14a includes a wing box 60a formed from a forward spar 62a, an aft spar 64a, a root clevis 66a and a tip clevis 68a. In addition, wing airframe 14a includes a plurality of ribs 70a and a wing skin 72a presented in phantom lines to reveal the components disposed therein. Root clevis 66a of wing airframe 14a is pivotably coupled to a forward clevis 74a of fuselage link 56a. More specifically, forward clevis 74a is received within root clevis 66a to form a double clevis with a root attachment pin 76a extending therethrough to allow wing airframe 14a to pivot relative to fuselage link 56a. Tip clevis 68a of wing airframe 14a is pivotably coupled to a forward clevis 78a of pylon link 58a. More specifically, forward clevis 78a is received within tip clevis 68a to form a double clevis with a tip attachment pin 80a extending therethrough to allow wing airframe 14a to pivot relative to pylon link 58a.

Figure 5A:
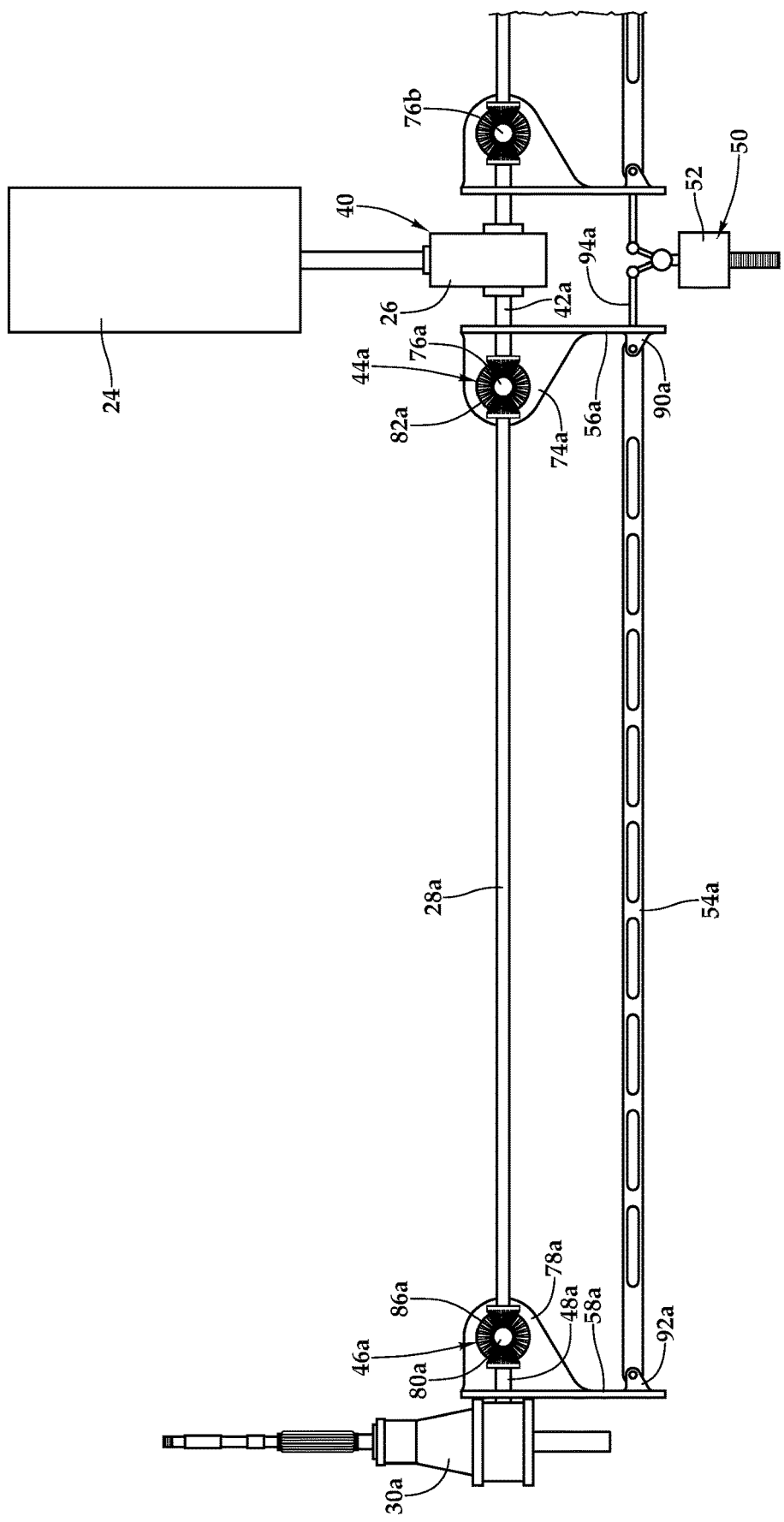
FIGS. 5A-5B are plan views of mechanical components of a variable-sweep wing of a high-speed tiltrotor aircraft in accordance with embodiments of the present disclosure.
Figure 5B:
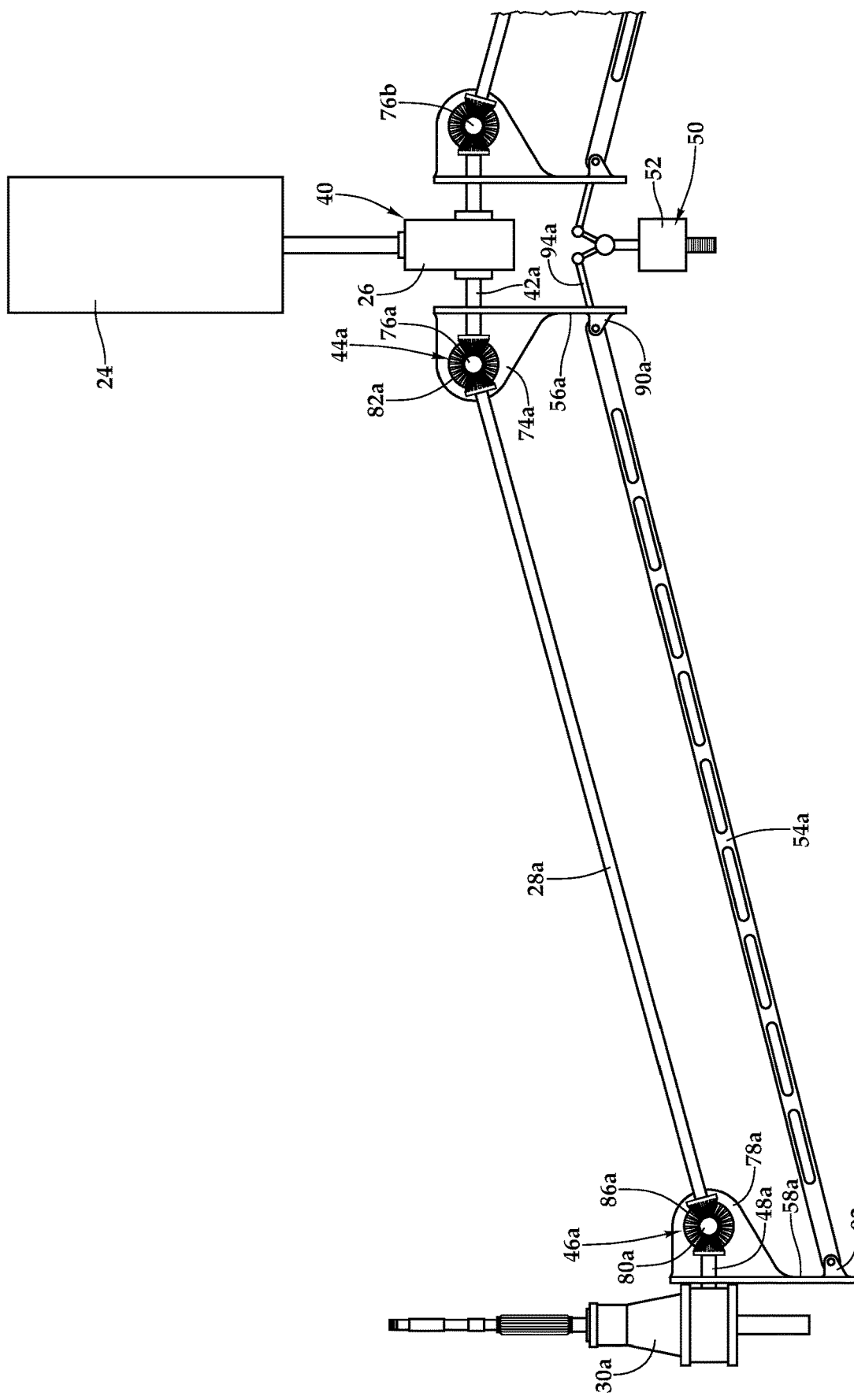
Figure 6:
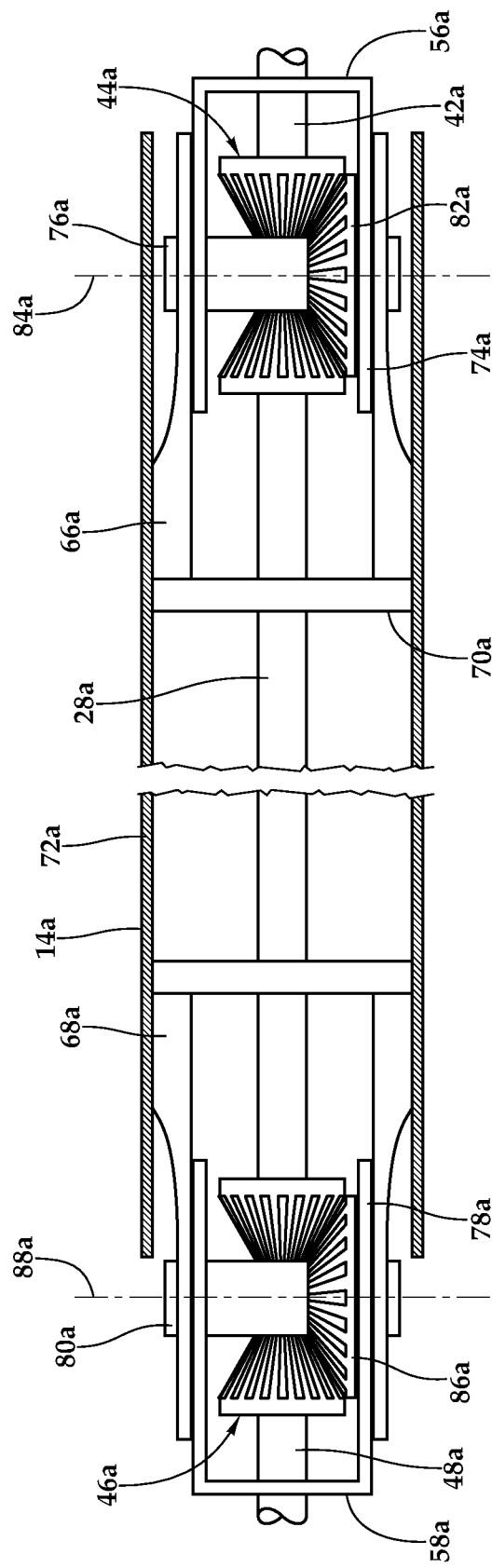
FIG. 6 is a rear elevation view, partially in cross section, of a variable-sweep wing of a high-speed tiltrotor aircraft in accordance with embodiments of the present disclosure.

Referring additionally to FIGS. 5A-5B and 6 of the drawings, details relating to the actuation of wing airframe 14a will now be discussed. It should be noted that in FIGS. 5A-5B, wing airframe 14a, the top plate of forward clevis 74a and the top plate of forward clevis 78a have been removed to better reveal other components. An idler gear 82a of root bevel gear set 44a is rotatably supported by root attachment pin 76a such that the root end of wing airframe 14a pivots about the axis of rotation 84a of idler gear 82a. Similarly, an idler gear 86a of tip bevel gear set 46a is rotatably supported by tip attachment pin 80a such that the tip end of wing airframe 14a pivots about the axis of rotation 88a of idler gear 86a. Driveshaft 28a is coupled between root bevel gear set 44a and tip bevel gear set 46a and thus between forward clevis 74a of fuselage link 56a and forward clevis 78a of pylon link 58a. Driveshaft 28a is positioned within wing box 60a between forward spar 62a and aft spar 64a. In the illustrated embodiments, driveshaft 28a extends through each of ribs 70a and is disposed within the interior of wing skin 72a. Crank 54a is pivotably coupled between an aft clevis 90a of fuselage link 56a and an aft clevis 92a of pylon link 58a. In the illustrated embodiment, crank 54a extends through each of ribs 70a and is disposed within the interior of wing skin 72a aft of driveshaft 28a and wing box 60a. An inboard end of crank 54a is coupled to or is integral with a lever 94a that couples crank 54a to actuator 52 within fuselage 12. In this configuration, driveshaft 28a and crank 54a are substantially parallel with one another.

Fuselage link 56a, pylon link 58a, crank 54a and driveshaft 28a form a linkage such that when actuator 52 moves toward the extended position, lever 94a moves forward which causes crank 54a to pivot aftwardly about aft clevis 90a of fuselage link 56a. The aftward pivoting of crank 54a causes wing airframe 14a to shift from the straight wing configuration (FIGS. 4A/5A) to the swept wing configuration (FIGS. 4B/5B). In addition, the aftward pivoting of crank 54a causes driveshaft 28a to precess about idler gear 82a of root bevel gear set 44a and idler gear 86a of tip bevel gear set 46a, such that crank 54a and driveshaft 28a remain substantially parallel to each other. Likewise, when actuator 52 moves toward the retracted position, lever 94a moves aftward which causes crank 54a to pivot forwardly about aft clevis 90a of fuselage link 56a. The forward pivoting of crank 54a causes wing airframe 14a to shift from the swept wing configuration (FIGS. 4B/5B) to the straight wing configuration (FIGS. 4A/5A). In addition, the forward pivoting of crank 54a causes driveshaft 28a to precess about idler gear 82a of root bevel gear set 44a and idler gear 86a of tip bevel gear set 46a, such that crank 54a and driveshaft 28a remain substantially parallel to each other. In the illustrated embodiments, the linkage formed by fuselage link 56a, pylon link 58a, crank 54a and driveshaft 28a is a four-bar linkage and preferably a four-bar parallelogram linkage, such that when crank 54a pivots about aft clevis 90a of fuselage link 56a, fuselage link 56a and pylon link 58a remain substantially parallel to each other, which enables longitudinal axes 36a, 36b of pylon assemblies 18a, 18b to remain substantially parallel to longitudinal axis 38a of fuselage 12 in both the straight wing configuration and the swept wing configuration of variable-sweep wing 14 as well as during transitions therebetween, which tends to minimize the drag penalty created by pylon assemblies 18a, 18b during forward flight and particularly during high-speed forward flight.

Even though a particular actuation system that collectively actuates wing airframes 14a, 14b has been depicted and described, it should be understood by those having ordinary skill in the art that other actuations systems could alternatively be used to shift wing airframes 14a, 14b between the various sweep angles. For example, wing airframes 14a, 14b could be individually actuated using two linear actuators located within fuselage 12. Alternatively, wing airframes 14a, 14b could be individually actuated using two rotary actuators such as two slew ring actuators each positioned coaxially relative to one of the root attachment pins 76a, 76b.

Figure 7A:
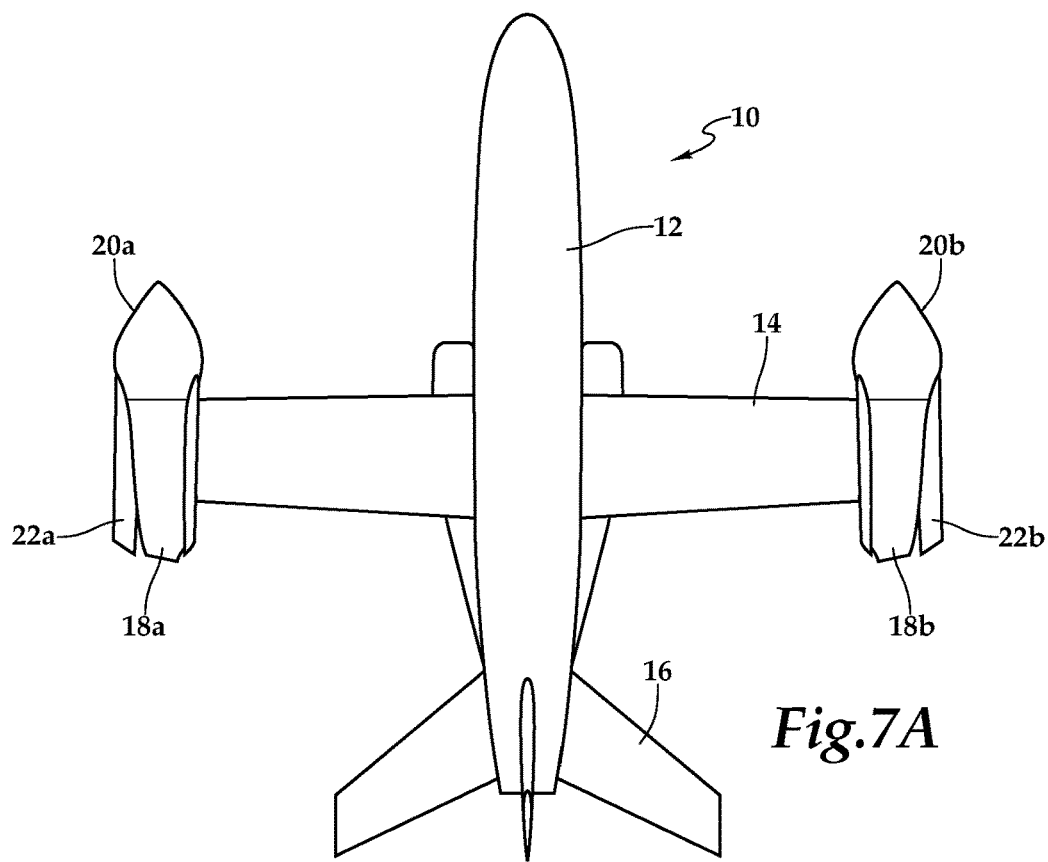
FIGS. 7A-7D are plan views of a high-speed tiltrotor aircraft having a variable-sweep wing in various wing configurations in accordance with embodiments of the present disclosure.
Figure 7B:
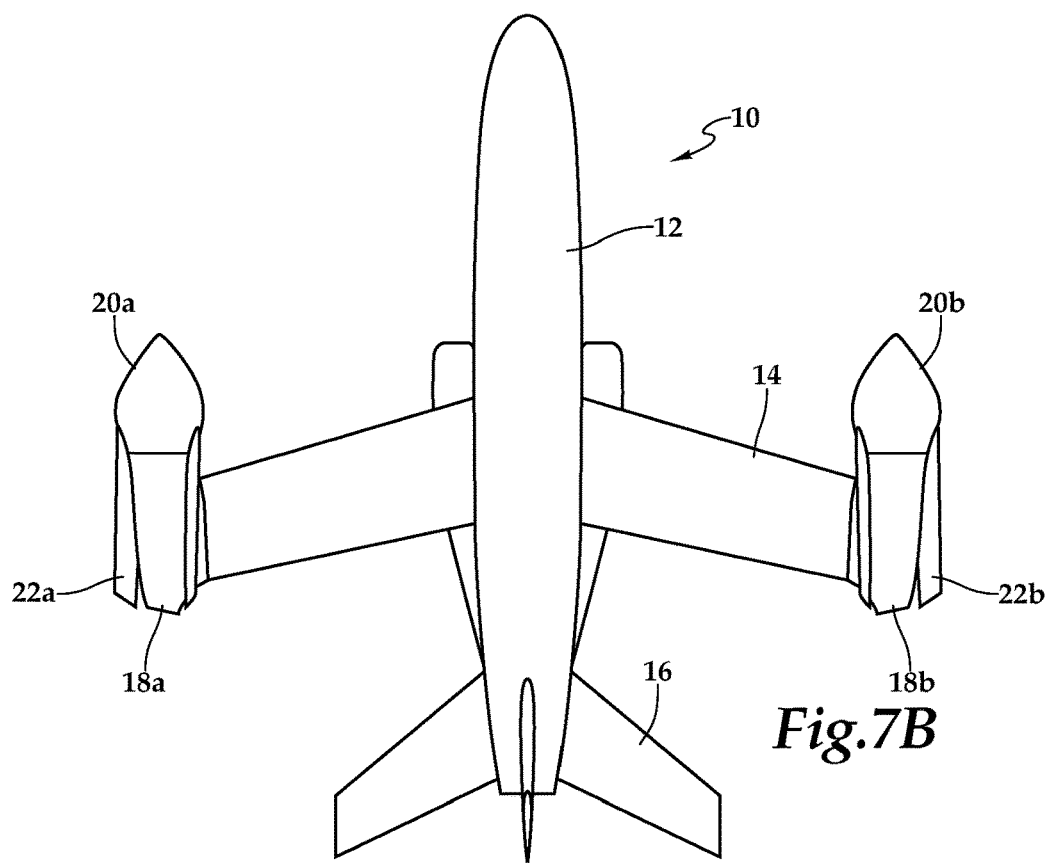
Figure 7C:
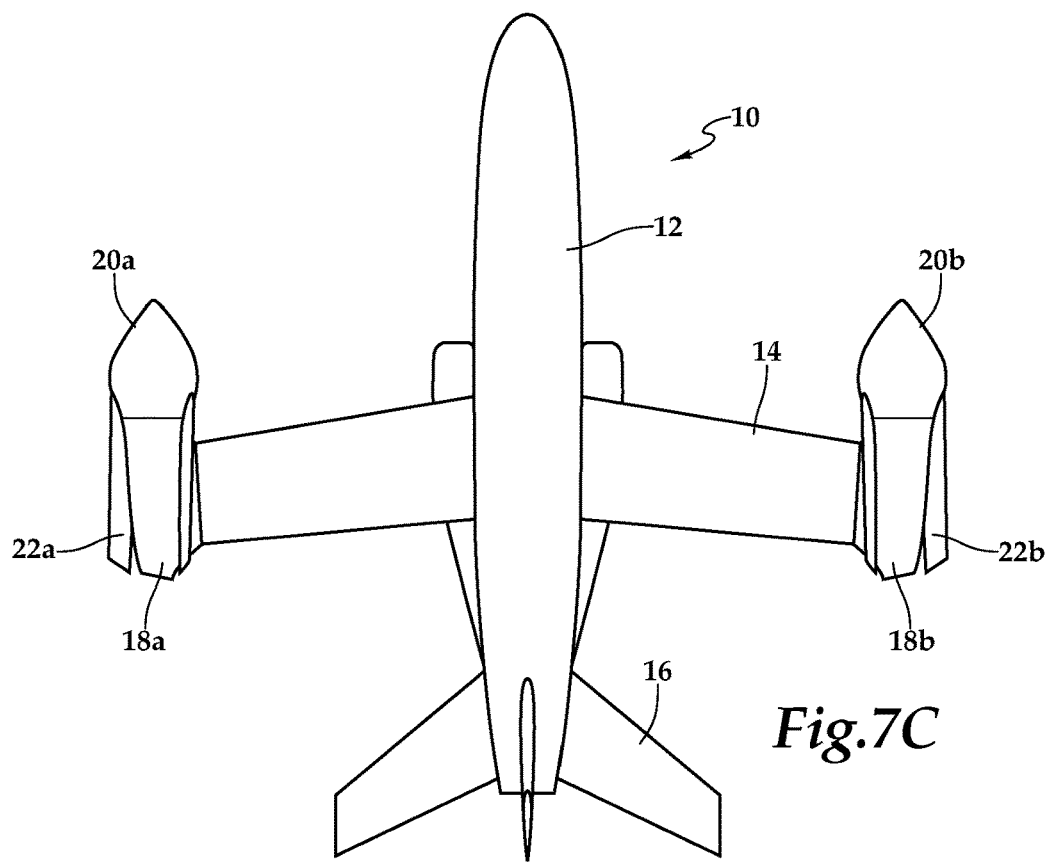

In addition, even though variable-sweep wing 14 has been depicted and described in two particular sweep angles relative to fuselage 12, it should be understood by those having ordinary skill in the art that variable-sweep wing 14 could have an infinite number of sweep angles relative to fuselage 12. For example, in FIG. 7A, aircraft 10 is depicted in a substantially straight wing configuration with a sweep angle of substantially zero. In FIG. 7B, aircraft 10 is depicted in a swept wing configuration with a sweepback angle of about twenty degrees. FIGS. 7A-7B are representative of the embodiments depicted and described in FIGS. 1A-6. In FIG. 7C, aircraft 10 is depicted in a swept wing configuration with a sweepback angle of about ten degrees. FIG. 7C may represent an intermediate position between the substantially straight wing configuration depicted in FIG. 7A and the swept wing configuration depicted in FIG. 7B. Alternatively, the swept wing configuration of FIG. 7C may represent the maximum sweepback angle of aircraft 10 in an embodiment in which variable-sweep wing 14 is shiftable between the substantially straight wing configuration depicted in FIG. 7A and the swept wing configuration depicted in FIG. 7C. In another alternative, the swept wing configuration of FIG. 7C may represent the minimum sweepback angle of aircraft 10 in an embodiment in which variable-sweep wing 14 is shiftable between the swept wing configuration depicted in FIG. 7C and the swept wing configuration depicted in FIG. 7B, in which case the aircraft may not have substantially straight wing configuration. It should be noted that the swept wing configuration depicted in FIG. 7B may represent an intermediate position between the substantially straight wing configuration depicted in FIG. 7A or the swept wing configuration depicted in FIG. 7C and a swept wing configuration having a sweepback angle greater than twenty degrees.

Figure 7D:
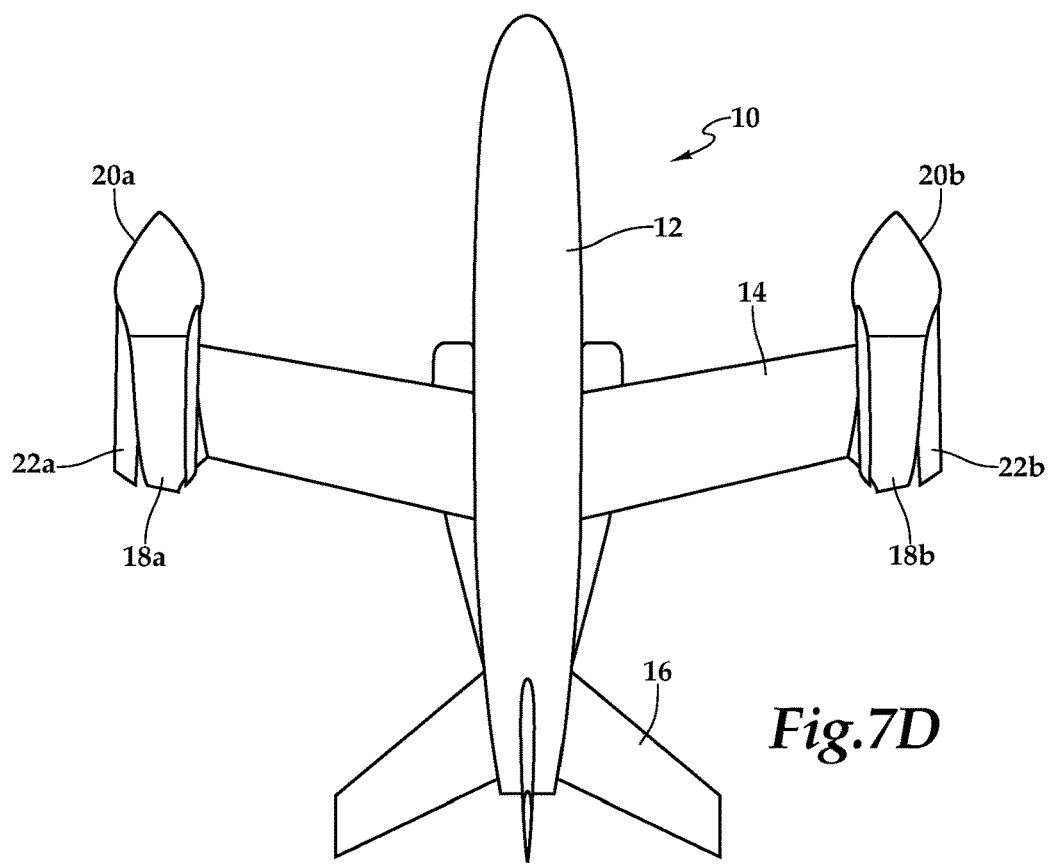

In FIG. 7D, aircraft 10 is depicted in a swept wing configuration with a sweepforward angle of about twenty degrees. The swept wing configuration of FIG. 7D may represent the maximum sweepforward angle of aircraft 10 in an embodiment in which variable-sweep wing 14 is shiftable between the substantially straight wing configuration depicted in FIG. 7A and the swept wing configuration depicted in FIG. 7D. Alternatively, the swept wing configuration depicted in FIG. 7D may represent an intermediate position between the substantially straight wing configuration depicted in FIG. 7A and a swept wing configuration having a sweepforward angle greater than twenty degrees. As another alternative, the swept wing configuration of FIG. 7D may represent the maximum sweepforward angle of aircraft 10 in an embodiment in which variable-sweep wing 14 is shiftable between the swept wing configuration depicted in FIG. 7C, the swept wing configuration depicted in FIG. 7B or other swept wing configuration having a sweepback angle. In still another alterative, the swept wing configuration depicted in FIG. 7D may represent an intermediate position between the swept wing configuration depicted in FIG. 7C, the swept wing configuration depicted in FIG. 7B or other swept wing configuration having a sweepback angle and a swept wing configuration having a sweepforward angle greater than twenty degrees. It should also be noted that aircraft 10 may have embodiments including a maximum sweepforward angle that is between zero degrees and twenty degrees.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A variable-sweep wing for a tiltrotor aircraft having a main gearbox disposed within a fuselage and a proprotor gearbox disposed within a pylon, the variable-sweep wing comprising:
   a fuselage link coupled to the fuselage;
   a pylon link coupled to the pylon;
   a wing airframe having a root end pivotably coupled to the fuselage link and a tip end pivotably coupled to the pylon link, the wing airframe shiftable between a substantially straight wing configuration and a swept wing configuration relative to the fuselage;
   a driveshaft coupled between the fuselage link and the pylon link and positioned at least partially within the wing airframe, the driveshaft operable to transmit torque from the main gearbox to the proprotor gearbox; and
   a crank coupled between the fuselage link and the pylon link and positioned at least partially within the wing airframe;
   wherein, the fuselage link, the pylon link, the driveshaft and the crank form a linkage such that pivoting the crank relative to the fuselage link causes the wing airframe to shift between the substantially straight wing configuration and the swept wing configuration.

2. The variable-sweep wing as recited in claim 1 wherein, the fuselage link is fixed relative to the fuselage.

3. The variable-sweep wing as recited in claim 1 wherein, the wing airframe further comprises a wing box including a forward spar and an aft spar, the driveshaft positioned between the forward and aft spars.

4. The variable-sweep wing as recited in claim 3 wherein, the wing airframe further comprises a plurality of ribs and a wing skin;
   wherein, the driveshaft extends through each of the ribs; and
   wherein, the crank is positioned aft of the driveshaft within an interior of the wing skin.

5. The variable-sweep wing as recited in claim 1 wherein, the driveshaft and the crank are substantially parallel with each other.

6. The variable-sweep wing as recited in claim 1 wherein, the linkage formed by the fuselage link, the pylon link, the driveshaft and the crank is a four-bar linkage.

7. The variable-sweep wing as recited in claim 1 wherein, the linkage formed by the fuselage link, the pylon link, the driveshaft and the crank is a four-bar parallelogram linkage.

8. The variable-sweep wing as recited in claim 1 wherein, the fuselage has a longitudinal axis and the pylon has a longitudinal axis; and
wherein, the longitudinal axis of the fuselage and the longitudinal axis of the pylon remain substantially parallel with each other when the wing airframe is in the substantially straight wing configuration and when the wing airframe is in the swept wing configuration.

9. The variable-sweep wing as recited in claim 1 further comprising an actuator disposed within the fuselage, the actuator configured to pivot the crank relative to the fuselage link.

10. The variable-sweep wing as recited in claim 9 wherein, the actuator is a linear actuator.

11. The variable-sweep wing as recited in claim 1 further comprising a root gear set coupled to the fuselage link; and
a tip gear set coupled to the pylon link;
wherein, the driveshaft is coupled between the root gear set and the tip gear set;
wherein, the root gear set is operable to transmit torque from the main gearbox to the driveshaft; and
wherein, the tip gear set is operable to transmit torque from the driveshaft to the proprotor gearbox.

12. The variable-sweep wing as recited in claim 11 further comprising an output shaft coupled between the main gearbox and the root gear set; and
an input shaft coupled between the tip gear set and the proprotor gearbox;
wherein, the output shaft is operable to transmit torque from the main gearbox to the root gear set; and
wherein, the input shaft is operable to transmit torque from the tip gear set to the proprotor gearbox.

13. The variable-sweep wing as recited in claim 11 wherein, the root gear set is a bevel gear set; and
wherein, the tip gear set is a bevel gear set.

14. A tiltrotor aircraft having a low-speed forward flight mode and a high-speed forward flight mode, the tiltrotor aircraft comprising:
a fuselage;
a main gearbox disposed within the fuselage;
a fuselage link coupled to the fuselage;
a pylon;
a proprotor gearbox disposed within the pylon;
a pylon link coupled to the pylon;
a wing airframe having a root end pivotably coupled to the fuselage link and a tip end pivotably coupled to the pylon link, the wing airframe shiftable between a substantially straight wing configuration and a swept wing configuration relative to the fuselage;
a driveshaft coupled between the fuselage link and the pylon link and positioned at least partially within the wing airframe, the driveshaft operable to transmit torque from the main gearbox to the proprotor gearbox; and
a crank coupled between the fuselage link and the pylon link and positioned at least partially within the wing airframe;
wherein, the fuselage link, the pylon link, the driveshaft and the crank form a linkage such that pivoting the crank relative to the fuselage link causes the wing airframe to shift between the substantially straight wing configuration for the low-speed forward flight mode and the swept wing configuration for the high-speed forward flight mode.

15. The tiltrotor aircraft as recited in claim 14 further comprising:
a lift engine disposed within the fuselage and operably coupled to the main gearbox; and
a thrust engine disposed within the fuselage.

16. The tiltrotor aircraft as recited in claim 14 wherein, the tiltrotor aircraft has a vertical takeoff and landing flight mode in which the wing airframe is in the substantially straight wing configuration.

17. The tiltrotor aircraft as recited in claim 14 wherein, the tiltrotor aircraft has a rotary forward flight mode in which the wing airframe is in the substantially straight wing configuration.

18. The tiltrotor aircraft as recited in claim 14 wherein, the tiltrotor aircraft has a plurality of non-rotary forward flight modes including the low-speed forward flight mode and the high-speed forward flight mode.

19. The tiltrotor aircraft as recited in claim 14 wherein, in the high-speed forward flight mode, the tiltrotor aircraft is configured for a forward airspeed that exceeds a maximum forward airspeed limited by proprotor aeroelastic instability in a rotary forward flight mode.

20. A tiltrotor aircraft having a vertical takeoff and landing flight mode, a rotary forward flight mode, a low-speed non-rotary forward flight mode and a high-speed non-rotary forward flight mode, the tiltrotor aircraft comprising:
a fuselage;
a wing pivotably coupled to the fuselage, the wing having first and second outboard ends, the wing shiftable between a substantially straight wing configuration and a swept wing configuration relative to the fuselage;
first and second pylon assemblies operably coupled to the wing proximate the first and second outboard ends, respectively; and
first and second proprotor assemblies operably coupled to the first and second pylon assemblies, respectively;
wherein, in the vertical takeoff and landing flight mode, the first and second proprotor assemblies rotate in a substantially horizontal plane and the wing is in the substantially straight wing configuration;
wherein, in the rotary forward flight mode, the first and second proprotor assemblies rotate in a substantially vertical plane and the wing is in the substantially straight wing configuration;
wherein, in the low-speed non-rotary forward flight mode, the first and second proprotor assemblies are non-rotating and the wing is in the substantially straight wing configuration; and
wherein, in the high-speed non-rotary forward flight mode, the first and second proprotor assemblies are non-rotating and the wing is in the swept wing configuration.

* * * * *